United States Patent
Williams et al.

(10) Patent No.: US 12,206,588 B2
(45) Date of Patent: Jan. 21, 2025

(54) SYSTEM AND METHOD FOR REDUCING BANDWIDTH USAGE OF A NETWORK

(71) Applicant: Adeia Media Holdings LLC, San Jose, CA (US)

(72) Inventors: Matthew Robert Williams, Kanata (CA); Yuri Nebogatov, Kanata (CA); Miika Anttoni Klemetti, Kanata (CA)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

(21) Appl. No.: 18/131,046

(22) Filed: Apr. 5, 2023

(65) Prior Publication Data

US 2023/0246973 A1 Aug. 3, 2023

Related U.S. Application Data

(63) Continuation of application No. 16/829,308, filed on Mar. 25, 2020, now Pat. No. 11,671,377, which is a
(Continued)

(51) Int. Cl.
| | |
|---|---|
| *H04L 47/2466* | (2022.01) |
| *H04L 47/193* | (2022.01) |
| *H04L 47/27* | (2022.01) |
| *H04L 47/32* | (2022.01) |
| *H04L 47/40* | (2022.01) |

(Continued)

(52) U.S. Cl.
CPC ........ *H04L 47/2466* (2013.01); *H04L 47/193* (2013.01); *H04L 47/27* (2013.01); *H04L 47/323* (2013.01); *H04L 47/40* (2013.01); *H04L 67/59* (2022.05); *H04L 69/163* (2013.01);
(Continued)

(58) Field of Classification Search
CPC ... H04L 47/2466; H04L 47/193; H04L 47/27; H04L 47/323; H04L 47/40; H04L 67/59; H04L 69/163; H04L 69/22; H04W 28/0273; H04W 80/06
See application file for complete search history.

(56) References Cited

U.S. PATENT DOCUMENTS

| | | |
|---|---|---|
| 4,908,827 A | 3/1990 | Gates |
| 5,600,663 A | 2/1997 | Ayanoglu et al. |

(Continued)

*Primary Examiner* — Jung H Park
(74) *Attorney, Agent, or Firm* — Haley Guiliano LLP

(57) ABSTRACT

A method of reducing the bandwidth usage of a network comprises intercepting traffic between a TCP server and a TCP client using TCP protocols that use client acknowledgements; identifying client acknowledgements from the TCP protocols; identifying the sequence number of a last received client acknowledgements from the intercepted traffic; identifying the sequence number of a last sent client acknowledgement from the intercepted traffic; calculating an unacknowledged byte value based on the difference between the last received client acknowledgement sequence number and the last sent client acknowledgement sequence number; comparing the calculated unacknowledged byte value with a predetermined threshold value, to determine whether the calculated unacknowledged byte value is at least as great as the predetermined threshold value; and transmitting the identified client acknowledgements into the network when the compared unacknowledged byte value is at least as great as the predetermined threshold value.

6 Claims, 26 Drawing Sheets

Related U.S. Application Data continuation of application No. 16/044,695, filed on Jul. 25, 2018, now Pat. No. 10,645,012, which is a continuation of application No. 15/413,485, filed on Jan. 24, 2017, now Pat. No. 10,057,178, which is a continuation of application No. 14/606,834, filed on Jan. 27, 2015, now Pat. No. 9,590,913, which is a continuation-in-part of application No. 14/219,151, filed on Mar. 19, 2014, now Pat. No. 9,647,945, which is a continuation of application No. 13/022,073, filed on Feb. 7, 2011, now Pat. No. 8,717,900.

(51) Int. Cl.
| | | |
|---|---|---|
| H04L 67/59 | (2022.01) | |
| H04L 69/163 | (2022.01) | |
| H04L 69/22 | (2022.01) | |
| H04W 28/02 | (2009.01) | |
| H04W 80/06 | (2009.01) | |

(52) U.S. Cl.
CPC ......... *H04W 28/0273* (2013.01); *H04L 69/22* (2013.01); *H04W 80/06* (2013.01)

(56) References Cited

U.S. PATENT DOCUMENTS

| | | | |
|---|---|---|---|
| 5,677,918 A | 10/1997 | Tran et al. | |
| 5,751,970 A | 5/1998 | Bournas | |
| 5,857,072 A | 1/1999 | Crowle | |
| 6,000,053 A | 12/1999 | Levine et al. | |
| 6,012,159 A | 1/2000 | Fischer et al. | |
| 6,126,310 A | 10/2000 | Osthoff et al. | |
| 6,172,972 B1 | 1/2001 | Birdwell et al. | |
| 6,272,148 B1 | 8/2001 | Takagi et al. | |
| 6,272,658 B1 | 8/2001 | Steele et al. | |
| 6,278,716 B1 | 8/2001 | Rubenstein et al. | |
| 6,301,249 B1 | 10/2001 | Mansfield et al. | |
| 6,336,200 B1 | 1/2002 | Wolfgang | |
| 6,421,387 B1 | 7/2002 | Rhee | |
| 6,421,805 B1 | 7/2002 | McAuliffe | |
| 6,438,108 B1 * | 8/2002 | Kanljung | H04L 1/1678 714/748 |
| 6,445,717 B1 | 9/2002 | Gibson et al. | |
| 6,449,251 B1 | 9/2002 | Awadallah et al. | |
| 6,529,552 B1 | 3/2003 | Tsai et al. | |
| 6,570,843 B1 | 5/2003 | Wolfgang | |
| 6,606,723 B2 | 8/2003 | Wolfgang | |
| 6,609,223 B1 | 8/2003 | Wolfgang | |
| 6,728,924 B1 | 4/2004 | Lou et al. | |
| 6,744,766 B2 | 6/2004 | Alapuranen | |
| 6,868,083 B2 | 3/2005 | Aspotolopoulos et al. | |
| 6,876,669 B2 | 4/2005 | Shalom | |
| 6,901,051 B1 | 5/2005 | Hou et al. | |
| 7,016,409 B2 | 3/2006 | Unger | |
| 7,035,217 B1 | 4/2006 | Vicisano et al. | |
| 7,024,609 B2 | 5/2006 | Wolfgang et al. | |
| 7,050,396 B1 | 5/2006 | Cohen et al. | |
| 7,065,482 B2 | 6/2006 | Shorey et al. | |
| 7,075,936 B2 | 7/2006 | Hathawa et al. | |
| 7,089,478 B2 | 8/2006 | Commings et al. | |
| 7,133,407 B2 | 11/2006 | Jinzaki et al. | |
| 7,167,704 B2 | 1/2007 | Chang et al. | |
| 7,215,683 B2 | 5/2007 | Burkert et al. | |
| 7,236,481 B2 | 6/2007 | Kim | |
| 7,310,670 B1 | 12/2007 | Walbeck et al. | |
| 7,319,701 B2 | 1/2008 | Guven et al. | |
| 7,369,498 B1 | 5/2008 | Ma et al. | |
| 7,522,606 B1 | 4/2009 | Swndrovitz | |
| 7,609,716 B2 | 10/2009 | Brown et al. | |
| 7,720,063 B2 | 5/2010 | Maiorana et al. | |
| 7,739,398 B1 | 6/2010 | Shabtay | |
| 7,742,501 B2 | 6/2010 | Williams | |
| 7,801,044 B2 | 9/2010 | Moutarlier | |
| 7,821,937 B1 | 10/2010 | Guo | |
| 7,889,654 B2 | 2/2011 | Ramakrishnan et al. | |
| 7,936,785 B2 | 5/2011 | Ehret et al. | |
| 7,953,114 B2 | 5/2011 | Williams et al. | |
| 8,009,969 B2 | 8/2011 | Williams et al. | |
| 8,045,563 B2 | 10/2011 | Lee | |
| 8,437,370 B2 | 5/2013 | Williams et al. | |
| 8,780,705 B2 | 7/2014 | Robin et al. | |
| 2001/0009547 A | 1/2001 | Jinzaki et al. | |
| 2001/0040883 A1 | 11/2001 | Chang et al. | |
| 2002/0061059 A1 | 5/2002 | Ginesi | |
| 2002/0141448 A1 | 10/2002 | Marsunaga | |
| 2002/0146016 A1 | 10/2002 | Liu et al. | |
| 2002/0154631 A1 | 10/2002 | Makansi et al. | |
| 2002/0159396 A1 | 10/2002 | Carlson et al. | |
| 2002/0163888 A1 | 11/2002 | Grinfeld | |
| 2002/0164024 A1 | 11/2002 | Arakawa et al. | |
| 2003/0002499 A1 | 1/2003 | Cummings et al. | |
| 2003/0018793 A1 | 1/2003 | Mora | |
| 2003/0035440 A1 | 2/2003 | Casaccia et al. | |
| 2003/0053461 A1 | 3/2003 | Ross | |
| 2003/0105997 A1 | 6/2003 | Mitlin et al. | |
| 2003/0108044 A1 | 6/2003 | Hendel | |
| 2003/0152058 A1 | 8/2003 | Cimini, Jr. et al. | |
| 2003/0219034 A1 | 11/2003 | Lotter et al. | |
| 2004/0010736 A1 | 1/2004 | Alapuranen | |
| 2004/0015686 A1 | 1/2004 | Connor et al. | |
| 2004/0039827 A1 | 2/2004 | Thomas et al. | |
| 2004/0076680 A1 | 4/2004 | Soltes et al. | |
| 2004/0095885 A1 | 5/2004 | Yang | |
| 2004/0160943 A1 | 8/2004 | Cain | |
| 2004/0196785 A1 | 10/2004 | Janakiraman et al. | |
| 2004/0213197 A1 | 10/2004 | Zimmerman et al. | |
| 2004/0264396 A1 | 12/2004 | Ginzburg et al. | |
| 2004/0267945 A1 | 12/2004 | Reiss | |
| 2005/0025185 A1 | 2/2005 | Brown et al. | |
| 2005/0053002 A1 | 3/2005 | Chan et al. | |
| 2005/0130646 A1 | 6/2005 | Frank et al. | |
| 2005/0195859 A1 | 9/2005 | Mahany | |
| 2005/0213586 A1 | 9/2005 | Cyganski et al. | |
| 2005/0259577 A1 | 11/2005 | Sin | |
| 2006/0018315 A1 | 1/2006 | Baratakke et al. | |
| 2006/0029101 A1 | 2/2006 | Williams | |
| 2006/0031518 A1 | 2/2006 | Jennings, III | |
| 2006/0031849 A1 | 2/2006 | Macdonald et al. | |
| 2006/0106598 A1 | 5/2006 | Trombetta et al. | |
| 2006/0165163 A1 | 7/2006 | Burazerovic et al. | |
| 2006/0178143 A1 | 8/2006 | Chang et al. | |
| 2006/0210037 A1 | 9/2006 | Olafsson et al. | |
| 2006/0245384 A1 | 11/2006 | Talukdar et al. | |
| 2006/0268717 A1 | 11/2006 | Kanterakis | |
| 2007/0011321 A1 | 1/2007 | Huntington et al. | |
| 2007/0116052 A1 | 5/2007 | Yu et al. | |
| 2007/0157060 A1 | 7/2007 | Ganga et al. | |
| 2007/0177739 A1 | 8/2007 | Ganguly et al. | |
| 2008/0089228 A1 | 4/2008 | Lin et al. | |
| 2008/0089268 A1 | 4/2008 | Kinder et al. | |
| 2008/0095247 A1 | 4/2008 | Ohno et al. | |
| 2008/0151776 A1 | 6/2008 | Kure | |
| 2008/0151823 A1 | 6/2008 | Quigley et al. | |
| 2008/0240108 A1 | 10/2008 | Hyldgaard | |
| 2008/0304483 A1 | 12/2008 | Williams et al. | |
| 2009/0006920 A1 | 1/2009 | Munson et al. | |
| 2009/0049189 A1 | 2/2009 | Zhu et al. | |
| 2009/0116487 A1 | 5/2009 | Read | |
| 2009/0135950 A1 | 5/2009 | Hoffmann | |
| 2009/0268747 A1 | 10/2009 | Kurata et al. | |
| 2010/0005177 A1 | 1/2010 | Cagenius | |
| 2010/0023842 A1 | 1/2010 | Rahrer et al. | |
| 2010/0080167 A1 | 4/2010 | Cordeiro et al. | |
| 2010/0161741 A1 * | 6/2010 | Jiang | H04L 67/303 709/227 |
| 2010/0272122 A1 | 10/2010 | Williams et al. | |
| 2010/0299753 A1 * | 11/2010 | Yoo | H04W 12/126 726/22 |
| 2011/0044338 A1 | 2/2011 | Stahl et al. | |
| 2011/0103388 A1 | 5/2011 | Williams et al. | |
| 2011/0185073 A1 | 7/2011 | Jagadeeswaran et al. | |
| 2011/0206043 A1 | 8/2011 | Williams et al. | |

(56) References Cited

U.S. PATENT DOCUMENTS

| | | |
|---|---|---|
| 2012/0173719 A1* | 7/2012 | Hong .................... H04L 69/163 |
| | | 709/224 |
| 2012/0179796 A1 | 7/2012 | Nagaraj et al. |
| 2012/0201136 A1 | 8/2012 | Williams et al. |
| 2012/0203893 A1 | 8/2012 | Williams et al. |
| 2012/0213232 A1 | 8/2012 | Williams et al. |
| 2012/0287806 A1 | 11/2012 | Williams |
| 2013/0124682 A1 | 5/2013 | Williams et al. |

\* cited by examiner

Step 1400 - ACK #1

| 2500 | 4000 | | | 8500 | 10000 |
|---|---|---|---|---|---|
| 1401 | | | | 1402 | |

Step 1410 - ACK #2

| 2500 | 4000 | 5500 | 7000 | 8500 | 10000 |
|---|---|---|---|---|---|
| 1401 | | 1411 | | 1402 | |

Step 1420 - ACK #3

| 2500 | 4000 | 5500 | 7000 | 8500 | 10000 |
|---|---|---|---|---|---|
| 1401 | 1420 | 1411 | | 1402 | |

Step 1430 - Summarized ACK

| 2500 | | 7000 | 8500 | 10000 |
|---|---|---|---|---|
| 1431 | | | 1402 | |

FIG. 14 A

Step 1500 - Initial Aggregate Packet
Step 1510 - Add ACK to Aggregate Packet
Step 1520 - Add Second ACK to Aggregate Packet
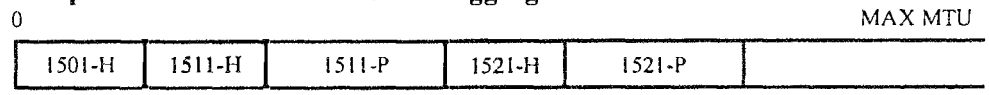
Step 1530 - Final Aggregate Packet
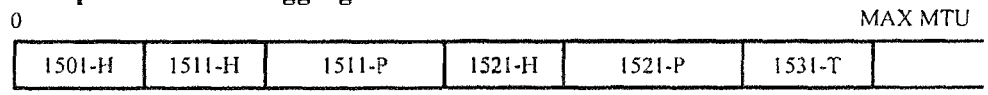
FIG. 15

Step 1600 – Parse the Aggregate Packet Contents
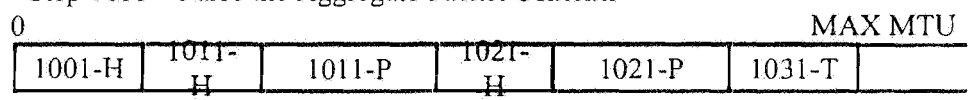
Step 1610 – Remove Aggregate Packet Header and Trailer
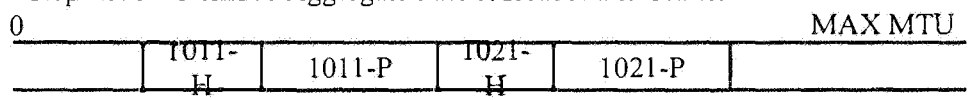
Step 1620 – Split Individual ACKs Apart
Step 1640 – Queue Packets to Egress Interface
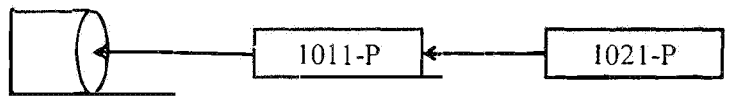
FIG. 16

SYSTEM AND METHOD FOR REDUCING BANDWIDTH USAGE OF A NETWORK

CROSS-REFERENCE TO RELATED APPLICATION

This application is a continuation of, and claims priority to, U.S. patent application Ser. No. 16/829,308, filed Mar. 25, 2020, now U.S. Pat. No. 11,671,377, which is a continuation of, and claims priority to, U.S. patent application Ser. No. 16/044,695, filed Jul. 25, 2018, now U.S. Pat. No. 10,645,012, which is a continuation of, and claims priority to, U.S. patent application Ser. No. 15/413,485, filed Jan. 24, 2017, now U.S. Pat. No. 10,057,178, which is a continuation of, and claims priority to, U.S. patent application Ser. No. 14/606,834, filed Jan. 27, 2015, now U.S. Pat. No. 9,590,913, which is a continuation-in-part of U.S. patent application Ser. No. 14/219,151, filed Mar. 19, 2014, now U.S. Pat. No. 9,647,945, which is a continuation of U.S. patent application Ser. No. 13/022,073, filed Feb. 7, 2011, now U.S. Pat. No. 8,717,900, each of which is hereby incorporated by reference herein in its entirety.

FIELD OF THE INVENTION

The present invention relates to communication data networks. More specifically, the present invention relates to systems and methods for increasing the throughput of data transmissions through a network as seen from the edge of the network.

BACKGROUND OF THE INVENTION

The Transmission Control Protocol (TCP) is one of the core protocols of the Internet Protocol suite. The TCP provides reliable, ordered delivery of a stream of bytes from one computer application to another computer application and provides the transport layer for many fundamental Internet applications such a web traffic, mail, and file transfer. TCP has been optimized for wired transmission. As such, packet loss is assumed to be the result of network congestion, and TCP has many mechanisms geared to deal with congestion that is triggered by packet loss. These mechanisms may be erroneously applied in a wireless networking scenario. Packet loss is more likely to have occurred due to some sporadic event such as interference or shading. If a computer application leveraging TCP for transport experiences packet loss in a wireless network, congestion control mechanisms actually lead to network underutilization.

In addition to the basic issues described above, some networks have additional challenges. Some networks may be bandwidth constrained, requiring minimization of bandwidth usage. Some networks, such as power-line, wireless or WIFI, are half-duplex such that each end uses the same frequency to transmit and receive. In this case, a handshake or other back-off/contention mechanism is required to ensure that each member of the half-duplex network can transmit without colliding with another end station. These collision avoidance mechanisms are generally optimized for larger packet sizes, which influence the setting of their retry and back-off timers. This is particularly problematic for TCP Acknowledgement (ACK) packets, which are sent often by a computer application as it is receiving data from another computer application. If such a constrained network is involved in the path of this data stream, the collision avoidance handshake is invoked often as data is acknowledged. Since the TCP ACKs are small, they violate the assumptions of the collision avoidance protocols leading to additional underutilization.

SUMMARY

In accordance with one embodiment, a method of reducing the bandwidth usage of a network comprises intercepting traffic between a TCP server and a TCP client using TCP protocols that use client acknowledgements; identifying client acknowledgements from the TCP protocols; identifying the sequence number of a last received client acknowledgements from the intercepted traffic; identifying the sequence number of a last sent client acknowledgement from the intercepted traffic; calculating an unacknowledged byte value based on the difference between the last received client acknowledgement sequence number and the last sent client acknowledgement sequence number; comparing the calculated unacknowledged byte value with a predetermined threshold value, to determine whether the calculated unacknowledged byte value is at least as great as the predetermined threshold value; and transmitting the identified client acknowledgements into the network when the compared unacknowledged byte value is at least as great as the predetermined threshold value. In one implementation, the intercepting step is performed at an intercepting device located between a TCP server and at least one TCP client. The last sent client acknowledgement is preferably sent from at least one of the TCP clients.

In accordance with another embodiment, a system for reducing the bandwidth usage of a network, the method comprises a TCP server and a TCP client using TCP protocols that use client acknowledgements; and an intercepting network device located between the TCP server and the TCP client and adapted to receive the client acknowledgements flowing between the TCP server and the TCP client, and to transmit all the client acknowledgements into the network. In one implementation, the sequence numbers of a last received client acknowledgement and a last sent client acknowledgement sent from a client are identified at the intercepting network device, and an unacknowledged byte value based on the difference between the sequence numbers is compared to a predetermined threshold value. The client acknowledgements are preferably transmitted into the network from the intercepting device when the unacknowledged byte value is equal to or greater than the predetermined threshold value.

BRIEF DESCRIPTION OF THE DRAWINGS

Embodiments of the present invention will now be described, by way of example only, with reference to the attached Figures, wherein:

FIG. 14A illustrates the handling of Selective ACK packets by an intercepting network device encoder.

FIG. 15 illustrates the encoding of multiple ACKs from a TCP connection into a single packet by an intercepting network device.

FIG. 16 illustrates the decoding of multiple ACKs from a TCP connection into a single packet by an intercepting network device.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims. The invention will be described in the context of a wireless network, but it will be understood that it applies to any bandwidth constrained networks or to half-duplex networks.

Figure 1:
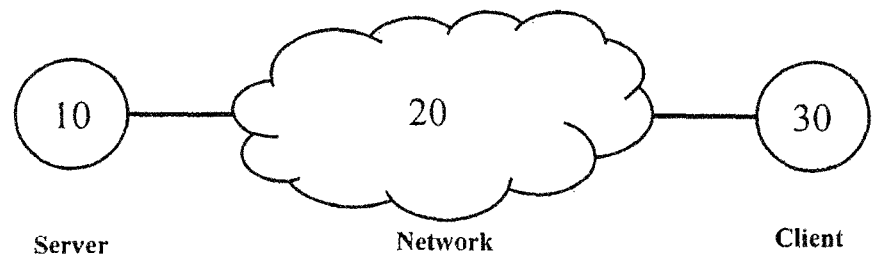
FIG. 1 is a diagrammatic illustration of a system in which a client and a server communicate via a network using TCP.

The Transmission Control Protocol (TCP) is one of the core Internet protocols providing reliable, ordered delivery of a stream of bytes from one computer application to another computer application. FIG. 1 illustrates the network elements involved in TCP operation. The first element is the TCP Server 10, which is characterized as a device that listens to a partially opened TCP port. The server sits on this port until other network elements, such as TCP clients, interact with the server using the open TCP port. A TCP Client is defined as a device, which requires reliable, ordered delivery of a stream of bytes from the server 10. The client 30 initiates a connection with the server 10 that is uniquely identified by the IP address and TCP port number of the server 10 in combination with the IP address and TCP port number of the client 30. Once the connection is established, reliable data flow is provided in both directions. The direction actually used is determined by the computer applications on the server 10 and the client 30. In the case of web traffic, the flow is in general from server to client. File Transfer Protocol (FTP) allows for the transfer in either direction. The client 30 can receive a file from the server 10 or put a file on the server 10.

The attributes of the network 20 are intentionally ambiguous. The only requirement is to ensure that TCP can work between the server 10 and the client 30. This means that the client 30 is able to determine the IP Address of the server 10, and the client 30 knows which TCP port on the server 10 is open for the client's application. Then, the network 20 needs to provide IP connectivity between the server 10 and the client 30.

Figure 2:
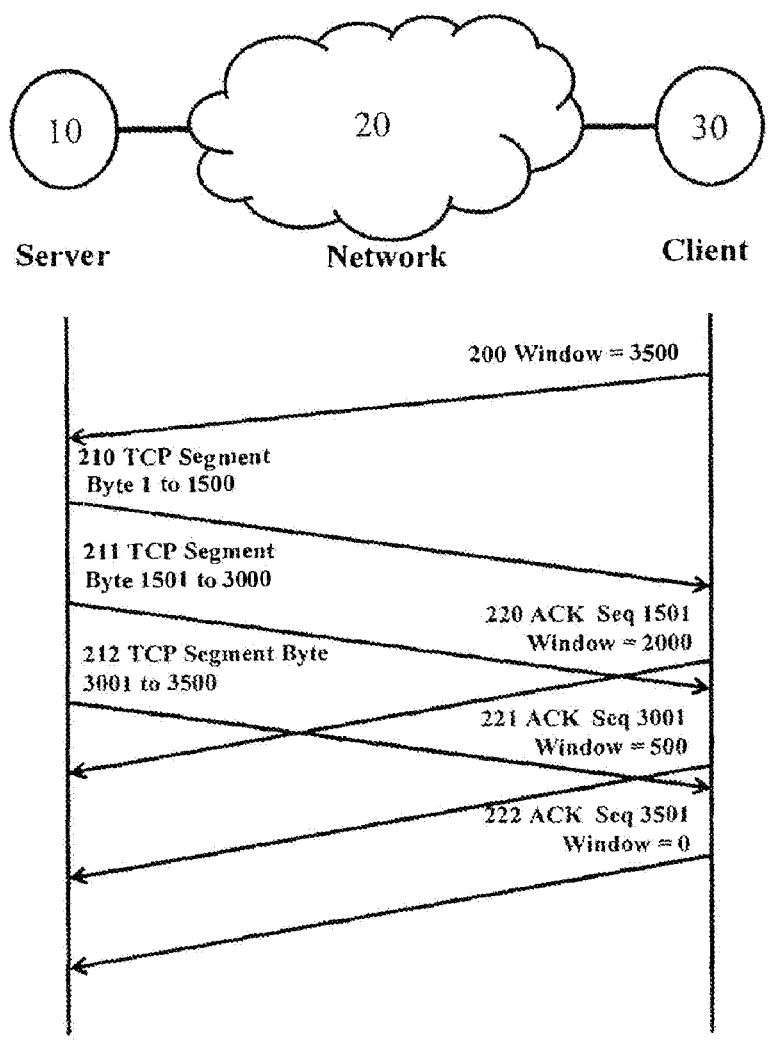
FIG. 2 illustrates a TCP Segment and TCP ACK exchange between the client and server in the system of FIG. 1.

In FIG. 2, the application of the server 10 is sending a flow of bytes to the application of the client 10. This flow begins with the client advertising a receive window size of 3500 bytes to the server in message 200. This message is part of the flow control mechanism provided by TCP to ensure that the client 30 is not overwhelmed with data from the server 10. When the message 200 arrives at the server 10, three TCP Segments are sent to the client 30 (messages 210 to 212) to fill the open receive window of the client 30. To provide reliable transfer of the data from the server 10, the client 30 acknowledges the arrival of the data using TCP ACK messages. All of the bytes from the server are numbered, and these additional bytes are acknowledged using the sequence number in the ACK message. In this case, the client 30 creates three TCP ACK messages 220 to 222. These messages are the focus of the mechanisms documented in this patent.

Figure 3:
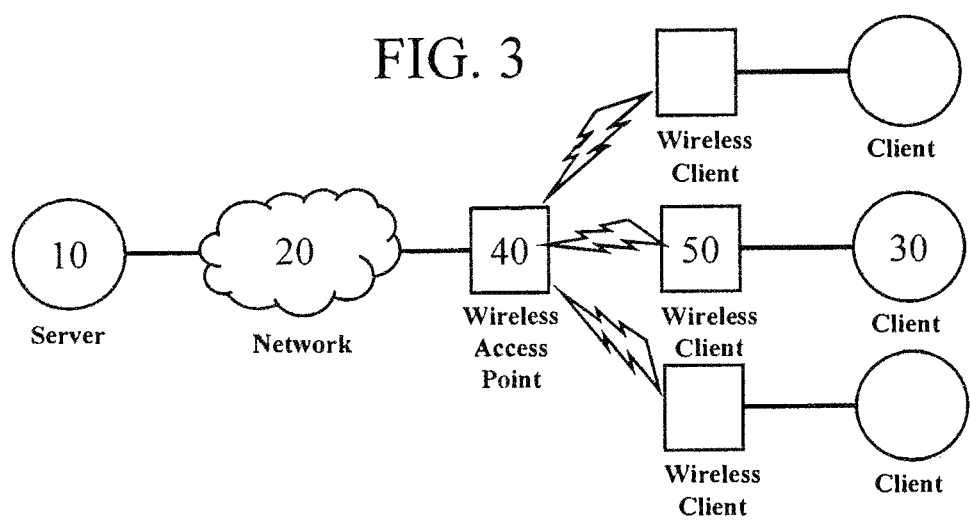
FIG. 3 is a diagrammatic illustration of a modification of the system of FIG. 1 that includes wireless network elements.
Figure 4:
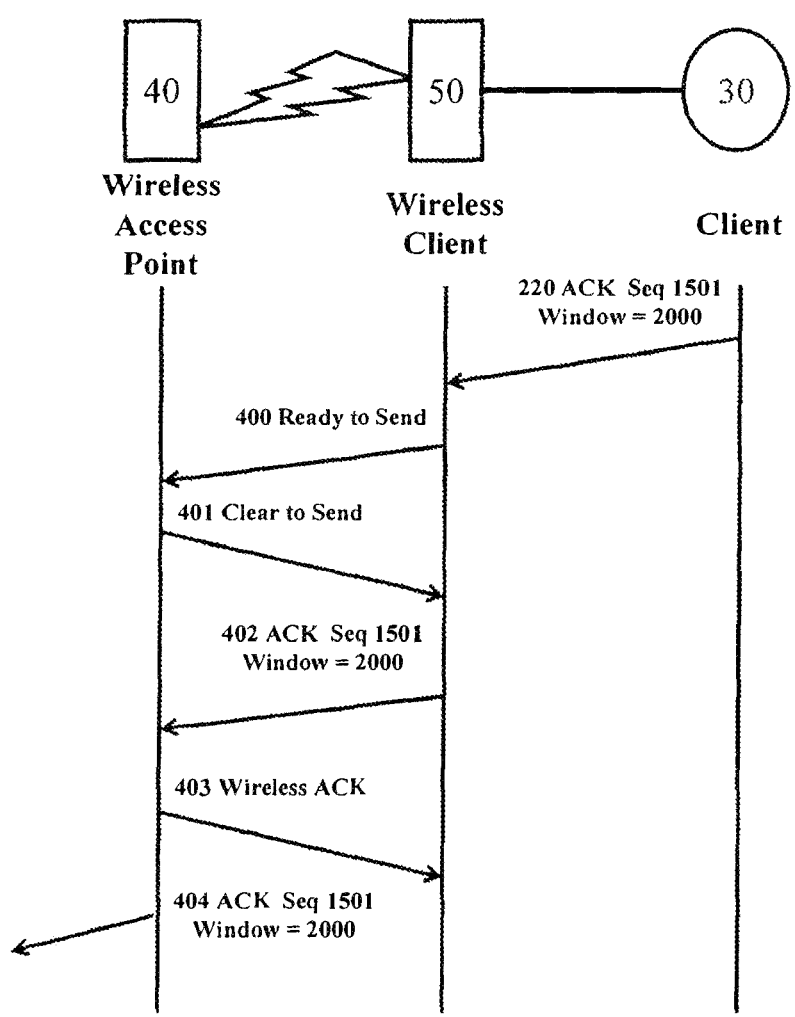
FIG. 4 is an illustration of wireless collision avoidance messages transmitted in the system of FIG. 3.

TCP ACK messages are problematic in half-duplex wireless networks that require collision avoidance mechanisms to ensure reliable data transfer. FIGS. 3 and 4 illustrate how these mechanisms affect TCP connections. The system of FIG. 3 adds a wireless LAN in the path between the server 10 and the client 30. A wireless client 50 provides access to the wireless LAN on behalf of the network devices on its wired side including the client 30. A wireless Access Point (AP) 40 connects many wireless clients (including the wireless client 50) to the network 20. Given the assumption that there are many wireless clients, a collision avoidance protocol is required to ensure that each wireless client is provided with equitable service on the wireless LAN. FIG. 4 illustrates an example of how this protocol can operate, leveraging an example implementation from Wi-Fi, IEEE 802.11. In this figure, the message 220 from FIG. 2 is traveling from the client 30 to the server 10, which is traversing the wireless LAN between the wireless AP 40 and the wireless client 50. When the wireless client 50 receives the TCP ACK in a message 220, it may announce that it is "Ready to Send," using a message 400. Assuming that this request is valid, the wireless AP 40 sends a "Clear to Send" indication to the wireless client 50 using a message 401 that allows the wireless client 50 to start sending the TCP ACK in a message 402. When the TCP ACK is received by the wireless AP 40, it sends a wireless Acknowledgement Frame in a message 403. At this point, the TCP ACK proceeds onto the server 10 through the network 20.

FIG. 4 illustrates a successful exchange allowing a wireless client to send the TCP ACK message 402 quickly. In many cases, the wireless client 50 will need to wait to send the message 402. For example, another wireless client could already be sending when the message 220 arrives at the wireless client 50. The wireless client 50 will need to wait until the Maximum Transmission Unit (MTU) length is sent by the other wireless client, which may be sending a smaller packet than the MTU, or has already started sending when the wireless client 50 receives the TCP ACK message 220. In either case, network utilization will suffer while access to the wireless LAN is negotiated by the wireless clients. Note that the wireless LAN between the wireless client 50 and the wireless AP 40 may not be on the only wireless link in the path between the client 30 and the server 10. If multiple half-duplex wireless links are in this the path, network utilization will suffer further.

In this situation, an Intercepting Network Device (IND) can be added to the path book-ending the wireless LAN to improve network utilization. The system of FIG. 5 includes an IND on the path between the client 30 and the server 10. An IND 70 is deployed between the client 30 and the wireless client 50 to provide functions that improve the network utilization for packets heading toward the wireless AP 40. A second IND 60 between the network 20 and the wireless AP 40 provides functions to improve network utilization toward the wireless clients, such as wireless client 50.

Figure 5:
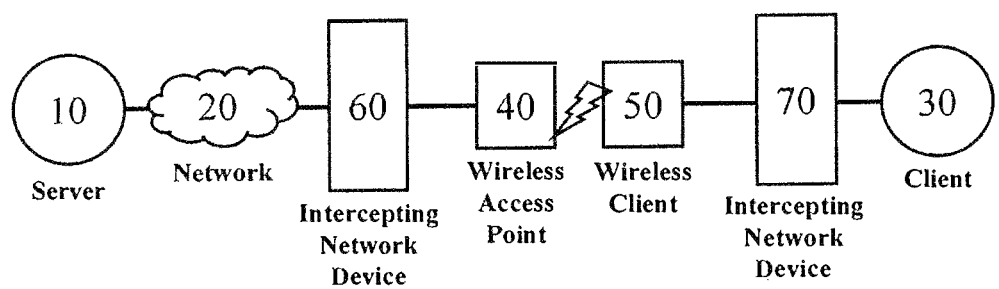
FIG. 5 is a diagrammatic illustration of a modification of the system of FIG. 3 that includes intercepting network devices.
Figure 6:
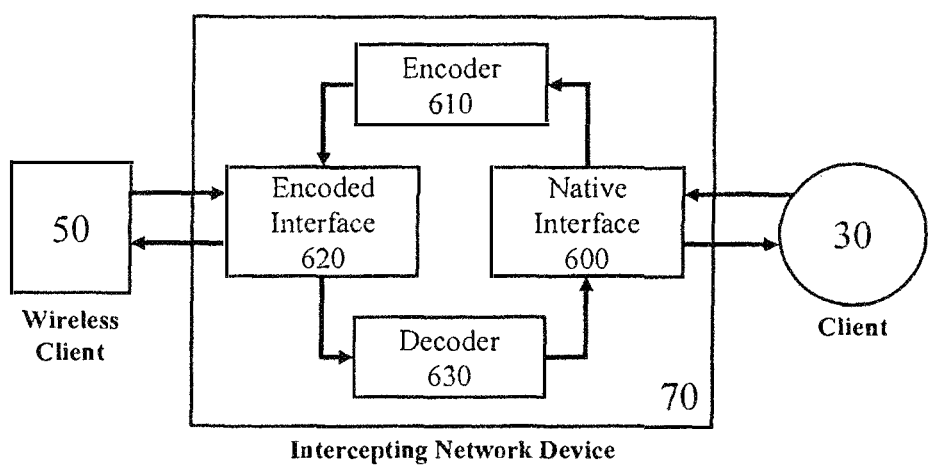
FIG. 6 is a block diagram illustrating the components in a intercepting network device used in the system of FIG. 5.

FIG. 6 illustrates an exemplary embodiment of the INDs shown in FIG. 5. FIG. 6 decomposes an IND 70 into modules necessary to implement the encoding protocol to improve wireless network performance. These modules can be resident in a single device, or can be distributed among several devices. As can be seen in FIG. 6, the IND 70 has a native interface 600, an encoded interface 620, a decoder 630 and an encoder 610. The native interface 600 sends and receives standard packets to and from the client 30. The encoded interface 620 sends and receives encoded packets to and from the wireless client 50.

The decoder 630 receives encoded packets from the encoded interface 620 and produces standard packets for transmission to the client 30 by way of the native interface 600. The encoder 610, on the other hand, receives standard packets from the native interface 600 and produces encoded packets for transmission to the wireless client 50 by way of the encoded interface 620. The specific algorithms used by the encoder and decoder are optional and programmable. Several embodiments are described below.

Figure 7:
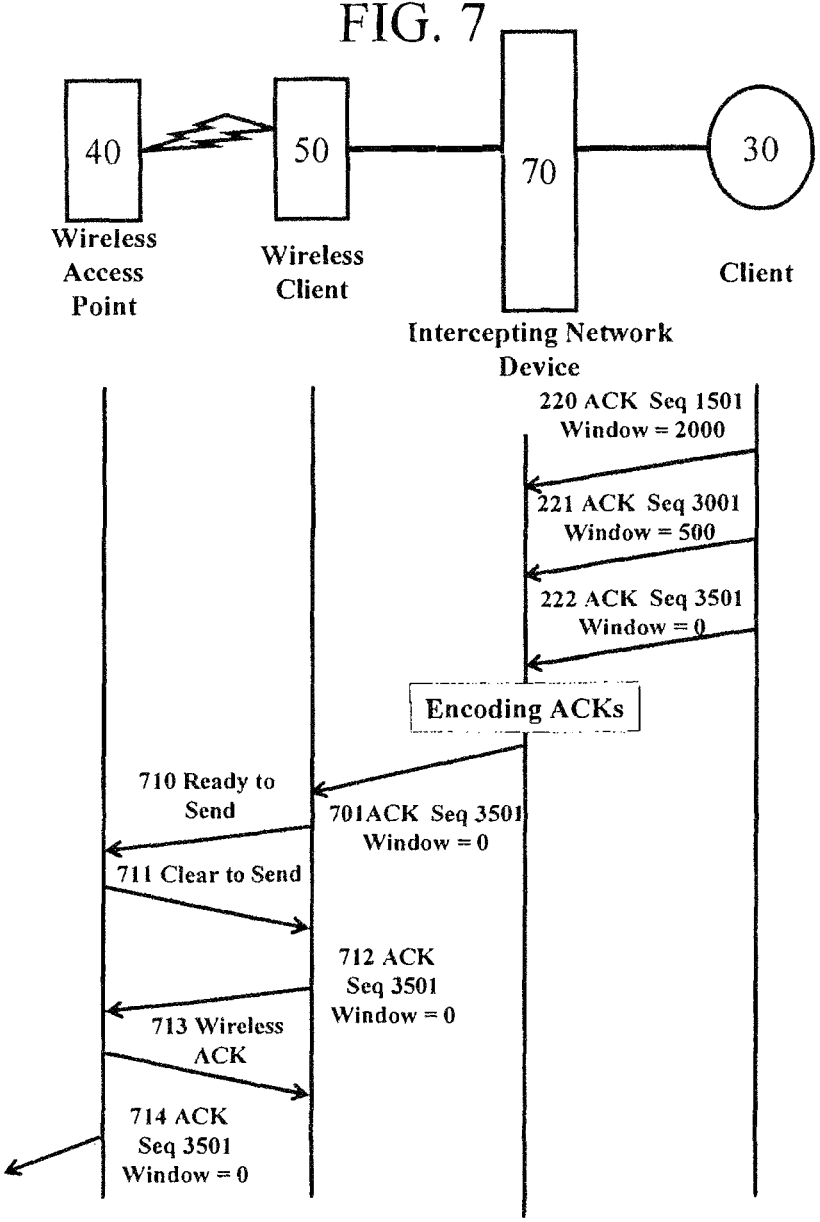
FIG. 7 is a diagrammatic illustration of an intercepting network device aggregating ACKs from a TCP connection into a single ACK packet.

In one implementation, the IND 60 and the IND 70 buffer ACKs from a TCP connection and summarize the information in a single ACK message for the connection. Since the ACK information in TCP messages is cumulative, the algorithm can be very simple. FIG. 7 demonstrates how this operation is accomplished for the packet sequence illustrated in FIG. 2. In this example, the three ACKs sent from the client 30 (messages 220 to 222) are buffered at the IND 70. The information in the three ACKs is summarized in a single ACK which is then forwarded to the wireless client 50 in a message 701. Then, the wireless client 50 negotiates with the wireless access point 40 to transmit this ACK over the wireless LAN. This negotiation, contained in the messages 710 to 713, is the same as the flow shown in FIG. 4. Then the TCP ACK is forwarded into the network 20 using a message 714. This flow demonstrates an important optimization provided by this algorithm. The number of collision avoidance negotiations is reduced by three to one, which reduces the overhead messaging, resulting in higher throughput.

FIG. 7 assumes that the client 30 is downloading a file from the server 10, which is a valid assumption for many computer applications such as web traffic. However, the client may also be uploading data onto the server using TCP. For example, the client 10 may be uploading a photo onto a web server using FTP to backup or to share. In this case, the IND 60 shown in FIG. 5 can perform the same functions as the IND 70, but in the reverse direction. The encoded interface for the IND 60 is connected to the wireless AP 40, and its native interface is connected to the network 20. The IND 60 then can summarize the TCP ACKs flowing from the server 10 toward the client 30 to improve the utilization of the wireless LAN between the wireless AP 40 and the wireless client 50.

Figure 8:
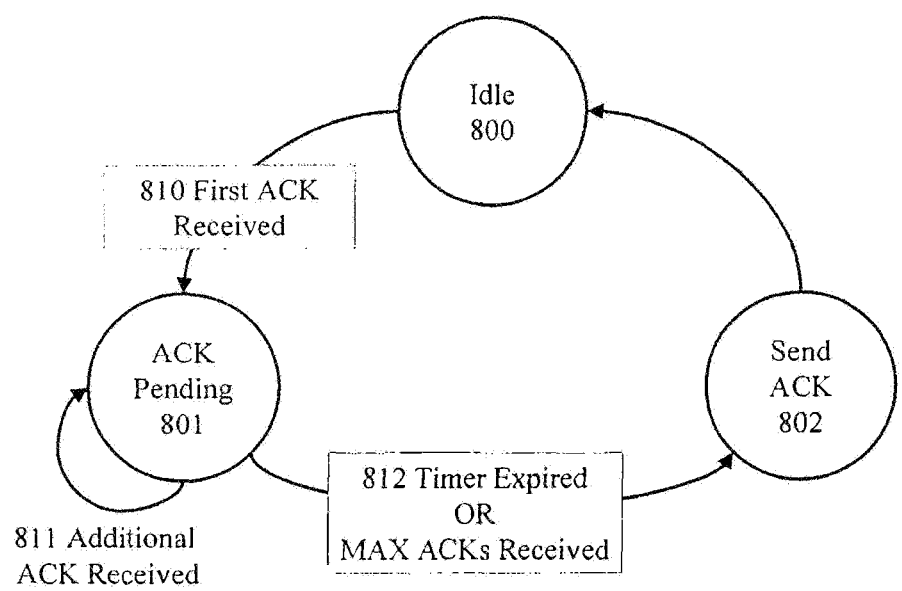
FIG. 8 is an illustration of a state machine that implements the aggregation of TCP ACKs into a single ACK packet.

To summarize the TCP ACKs for a connection, the encoders of the INDs (60 and 70) implement a state machine for each TCP connection. An embodiment of this state machine is illustrated in FIG. 8, which contains three states. The Idle state 800 is used to handle the time when the IND has no ACKs to handle for this TCP connection. In the ACK Pending State, the IND has received one (Event 810) or more (Event 811) ACKs, but the conditions have not been achieved to summarize the ACKs for transmission. Once enough time has expired, or a threshold number of ACKs has been achieved (now defined as MAX ACKs), the state machine transitions to the Send ACK state 802 and transmits the ACK. This is a transitory state and once the transmission of the ACK is complete, the state machine transitions to the Idle state 800.

Figure 9:
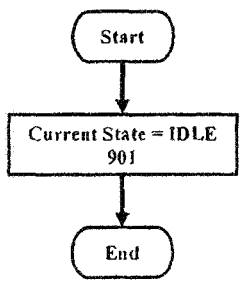
FIG. 9 is a flow chart for the state entry logic of the Idle State shown in FIG. 8.
Figure 10:
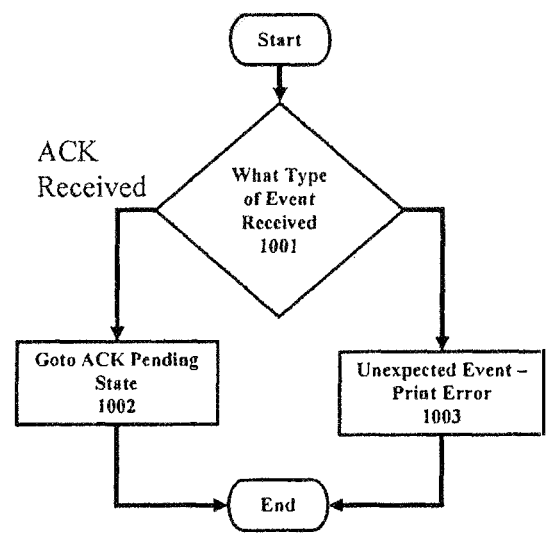
FIG. 10 is a flow chart of the event handling code for the Idle State shown in FIG. 8.

FIGS. 9 and 10 illustrate detailed handling of the Idle State 800. FIG. 9 provides the state entry functions for the Idle State 800. It simply sets the current state of the state machine to the Idle State (901). FIG. 10 is a flowchart of the algorithm for event handling in the Idle State 800. The algorithm starts by determining what type of event was received at step 1001. If the event is an ACK being received for this connection, the state machine transitions to ACK Pending state 801 at step 1002. Otherwise, an unexpected was received and an error event is generated at step 1003.

Figure 11:
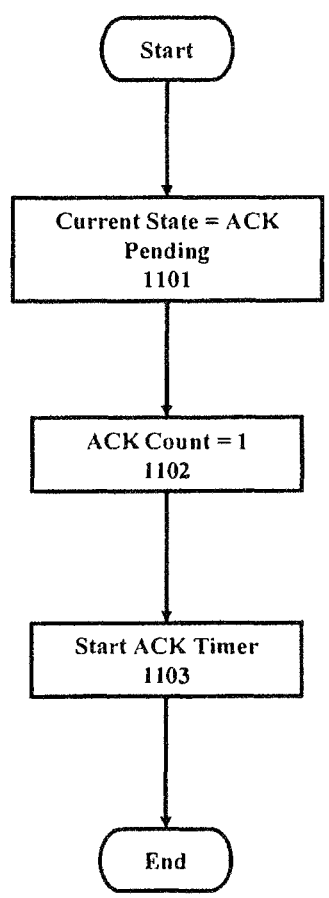
FIG. 11 is a flow chart for the state entry logic of the ACK Pending State shown in FIG. 8.
Figure 12:
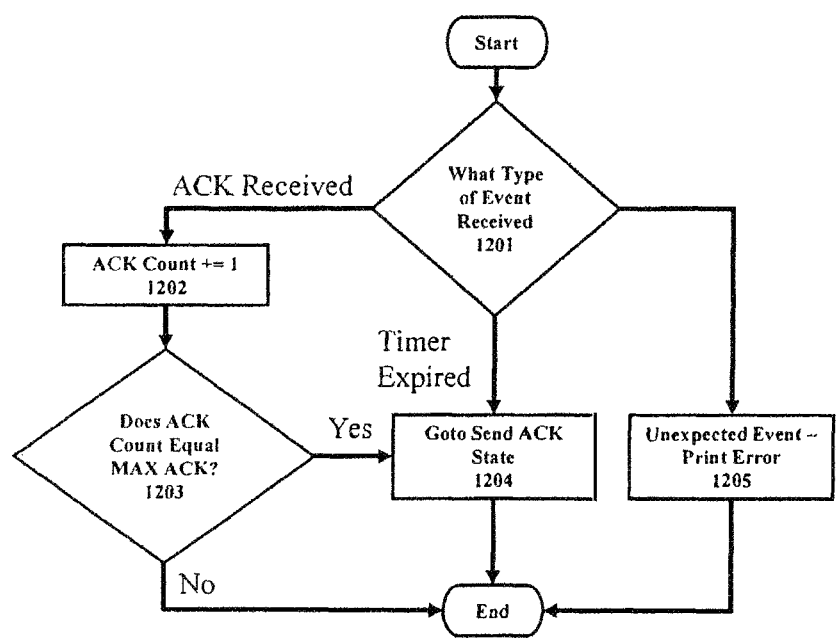
FIG. 12 is a flow chart of the event handling code for the ACK Pending State shown in FIG. 8.

FIGS. 11 and 12 illustrate detailed handling of the ACK Pending State 801. FIG. 11 provides the state entry functions for the ACK Pending State 801. It sets the current state to the ACK Pending State 801 at step 1101, sets the current count of received ACKs to 1 at step 1102 and starts the ACK Timer at step 1103. FIG. 12 is a flowchart of the algorithm for event handling in the ACK Pending State 801. The algorithm starts by determining what type of event was received at step 1201. If the event is an ACK being received for this connection, the current count of received ACKs is increased by 1 at step 1202 and is compared to MAX ACKs at step 1203. If MAX ACKs has been reached, the state machine transitions to the Send ACK State 802 at step 1204. If the timer expired event has been received, the state machine transitions to the Send ACK State 802 at step 1204. Otherwise, an unexpected was received and an error event is generated at step 1204.

Figure 13:
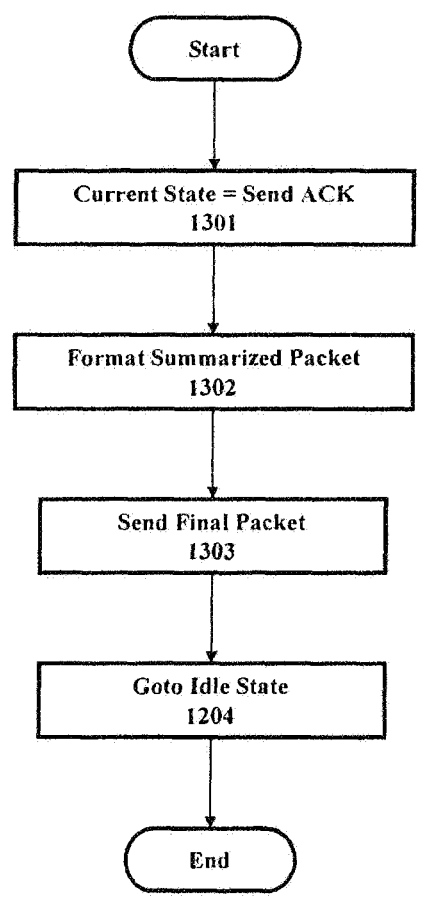
FIG. 13 is a flow chart for the state entry logic of the Send ACK State shown in FIG. 8.

FIG. 13 illustrates the functions performed in the Send ACK State 802. When the state machine reaches this state, all the ACKs received are summarized into a single ACK. Assuming no packet loss has been experienced, the last sequence number received is placed in the summarized ACK. Then the summarized ACK is queued for transmission at step 1303, and the state machine transitions to the Idle State 800.

When the ACK is summarized, the INDs (60 or 70) may have to deal with selective ACKs (or SACKs). This option is defined in RFC 2018 and allows the receiver to acknowledge discontinuous blocks of packets that were received correctly, in addition to the sequence number of the last contiguous byte received successively, as in the basic TCP acknowledgment. The acknowledgement can specify a number of SACK blocks, where each SACK block is conveyed by the starting and ending sequence numbers of a contiguous range that the receiver correctly received. FIG. 14A demonstrates how the encoder can deal with a SACK. The first ACK 1400 arrives from the client 30 with a sequence number of 4000 and a SACK block of 8500 to 10000. This is stored as the basis for the ACK which is forwarded onwards. The second ACK 1410 arrives with a selective ACK block of 5500 to 7000. The third ACK 1420 arrives with a SACK block of sequence number of 7000 which fills in the hole between 4000 and 5500. At this point the encoder 610 is ready to send the summarized TCP ACK which has a sequence number of 7000 and a SACK block of 8500 to 10000.

Note that the resulting encoded packet created by the IND 60 and the IND 70 is a standard TCP/IP packet. Therefore, no decoding of the packet is required, and the decoder function in the INDs (60 and 70) is NULL. Summarized TCP ACKs that arrive on the encoded interface of the IND 60 or the IND 70 can pass through unchanged. As well, no explicit signaling is required to create a connection between the INDs; they can proceed independently to improve network performance on the wireless LAN.

An implementation of this algorithm was used to measure the network utilization improvements leveraging a deployment similar to FIG. 5. The only difference was that the server 10 was wired directly into the IND 60, i.e., the network 20 was implemented as a physical wire. Then TCP flows were generated using the server 30, and the performance was measured over the wireless LAN. Flows were tested first with the INDs disabled and then with the INDs enabled with MAX ACK equal to 2. The resulting network utilization improvement is shown in the table below.

| INDs Disabled (Mbps) | INDs Enabled (Mbps) | Improvement % |
|---|---|---|
| 17.8 | 19.3 | 8.4 |
| 18.2 | 20.3 | 11.5 |
| 18.7 | 20.2 | 8.0 |

Figure 14B:
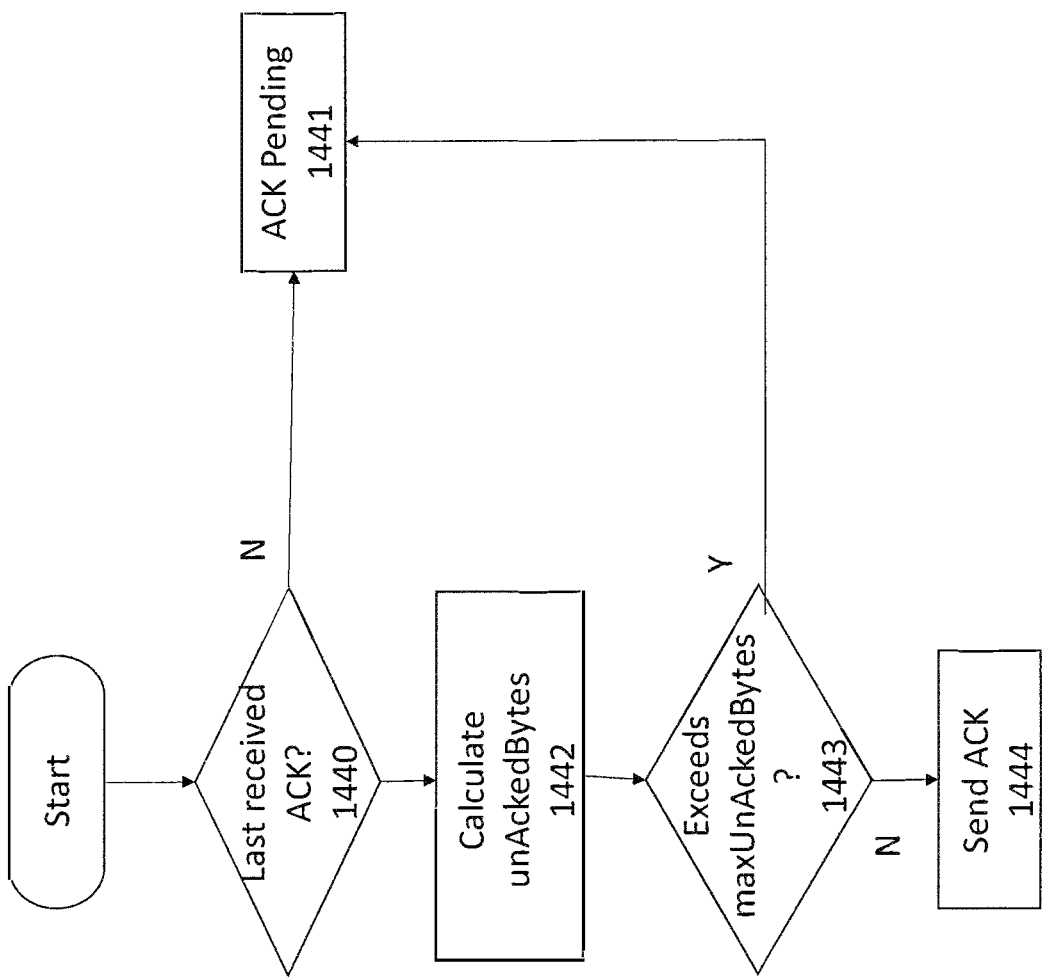
FIG. 14B is a flow chart showing unAckedBytes count calculations used in the state machine shown in FIG. 8

As another embodiment, the timer 812 (FIG. 8) and the ACK Count are complemented with another condition to move the state machine into the send state. FIG. 14B illustrates a method using the sequence number difference of the last sent ACK and previously received ACK, which may be used to move the state machine into the send state before the timer or the ACK Count conditions are met. This embodiment uses the unacknowledged bytes count, referred to as unAckedBytes, wherein the packet sequence number difference between a previously sent ACK packet and the last received ACK from step 1440 is used to calculate the unAckedBytes value at step 1442. Once calculated, a query at step 1443 is used to determine if the unAckedBytes exceeds a predefined threshold maxUnAckedBytes. If the unAckedbytes are equal to or greater than this threshold, the state machine moves to the send ACK state at step 1444 allowing the packet to be forwarded into the network. If it is below the threshold, then the state machine stays in the Pending state 1441, only moving to the send ACK state at step 1444 when the timer times out. The following formula is used to calculate the unAckedBytes:

$$unAckedBytes = lastReceivedAck - prevSentAck,$$

wherein the lastReceivedAck refers to the sequence number of the last received ACK, and the prevSentAck refers to the sequence number of the last sent ACK.

Therefore, the query at step 1443 is based on the following algorithm: if unAckedBytes>=maxUnAckedBytes, go to send ACK state, otherwise go to PEND state, wherein maxUnAckedBytes refers to the maximum unAcked byte count threshold and is a function of the measured RTT and BDP.

The motivation for unacknowledged byte count is to optimize a TCP stack's sending rate. If there are too few summarizing ACKs out of the buffered ACKs, the sending rate of the TCP stack (that receives the ACKs) may be affected.

As another embodiment, summarizing ACKs can be delayed long enough that the cumulative ACK can be piggybacked with a data packet flowing in the reverse direction (all data packets carry the cumulative ACK number).

An alternate implementation of the INDs uses a method of aggregating the TCP ACK packets instead of summarizing them as described above. FIG. 15 illustrates how these aggregate packets can be assembled from multiple TCP ACKs in a single TCP connection. Step 1500 shows an initial buffer which holds the header 1501-H for the next aggregate TCP packet produced. This header contains addressing to route packets between IND 60 and IND 70. It also contains information on the TCP connection that is associated with this pairing. This allows the decoder to understand what is inside and to break apart the aggregate packet into its original components. In step 1510, an entire TCP ACK is copied into the packet just after the aggregate packet header. This is completed in two parts. First, a header 1511-H is added to identify this as the start of a TCP ACK; this header can contain a marker identifying the contents and the length of the packet. Second, the TCP ACK packet (1511-P) is copied. This process is repeated in step 1520 by adding another header 1521-H to identify the ACK and packet 1521-P. Once the packet is ready to be sent, an optional trailer 1531-T can be included to carry association information to keep the INDs in sync or pertinent information for TCP ACKs included in the aggregate packet itself. This scheme is one of many that can be used to package multiple TCP ACKs into a single packet. Another option is to place all the ACKs back-to-back with the aggregate packet header containing markers to allow the packets to be split apart. The key is the aggregation of TCP ACKs.

FIG. 16 demonstrates how the aggregate packet is broken apart by the decoder on the other end of the wireless LAN. In step 1600, the original packet is received, and then the header and trailer are removed in step 1610. Then using the individual ACK headers 1101-H and 1121-H, the individual TCP ACKs are identified at step 1620. Once this is complete, the packets are queued for egress at step 1630.

Since functionality is required on the encoder of one end of the connection and the decoder of the other end of the connection, the IND 50 and the IND 60 must create an association with each other to provide the aggregation function. Signaling mechanisms as described in copending U.S. application Ser. No. 14/718,650, filed Mar. 5, 2010, and incorporated by reference herein, can be used to create this association. The only difference is the mechanism which is being signaled. Instead of signaling a session to improve network reliability, it is signaling a TCP ACK aggregation session.

Figure 17:
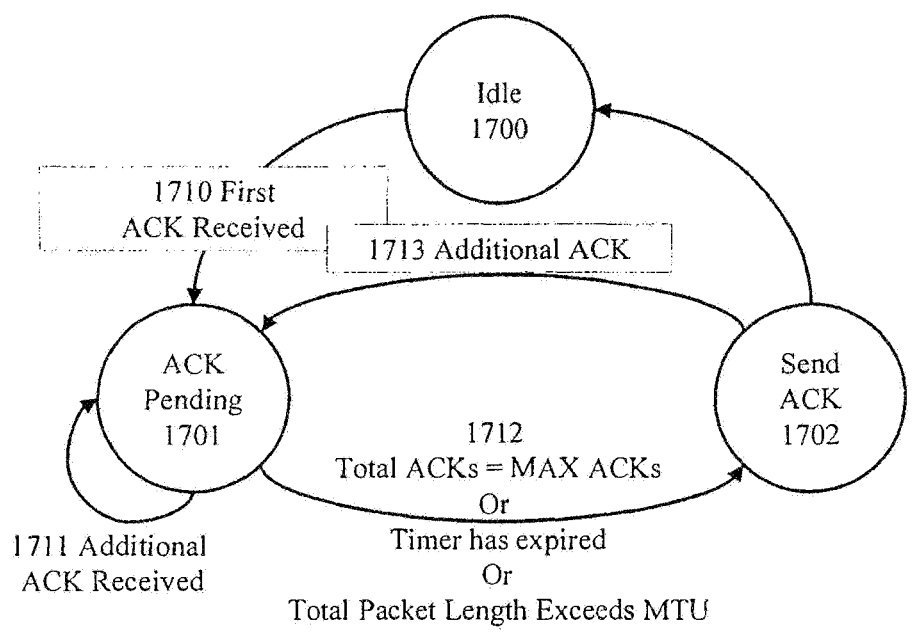
FIG. 17 is an illustration of a state machine that encodes multiple TCP ACKs from a TCP connection into a single packet.
Figure 18:
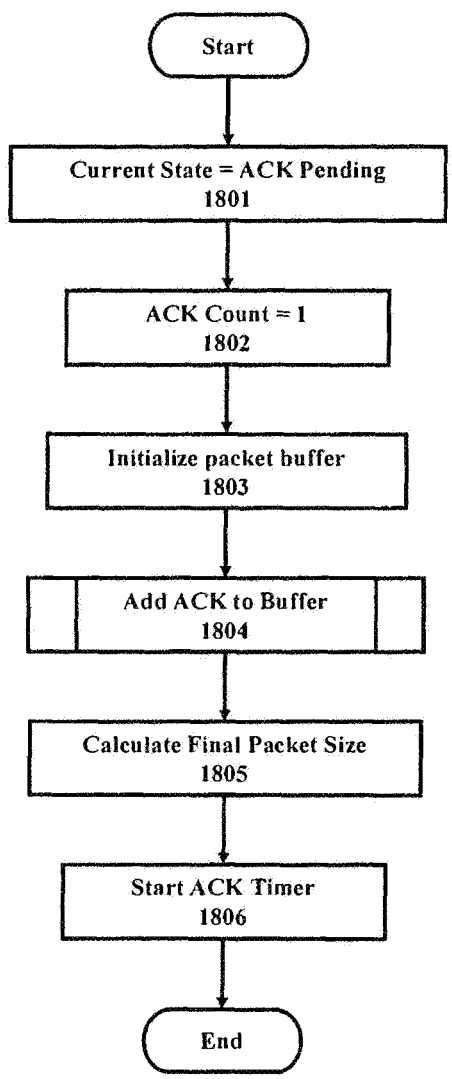
FIG. 18 is a flow chart of the state entry logic of the ACK Pending State shown in FIG. 17.

A state machine as shown in FIG. 17 implements the encoder functions to aggregate packets. It leverages the same states that were defined in FIG. 8, but the state handling and transitions are different. The Idle State 1700 processing is identical to FIG. 8 and is illustrated in FIG. 9 and FIG. 10. The ACK Pending State 1701 handling is different, and the entry function is illustrated in FIG. 18. When a TCP ACK is received, the encoder enters the ACK Pending state for the associated TCP connection at step 1801. The ACK Count is set to one at step 1802, and the encoder prepares the aggregated ACK buffer for the ACK by adding a header at step 1803. Then the ACK is added to the buffer at step 1804. Following what was prescribed in FIG. 15, a header is added before the TCP ACK packet, and the TCP ACK is added to the frame. This specific step may change depending on the packing algorithm. At this point, the final packet size is calculated at step 1805, and the ACK Timer is started at step 1806.

Figure 19:
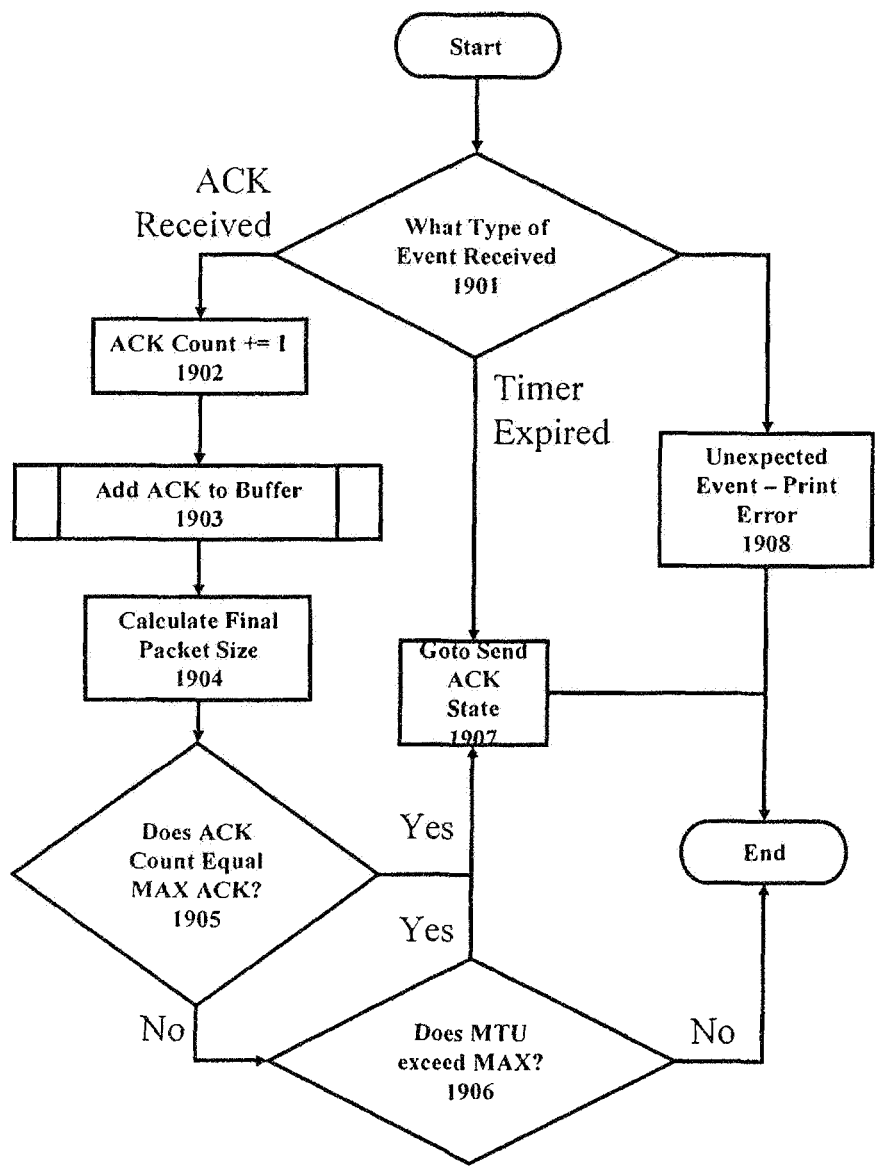
FIG. 19 is a flow chart of the event handling logic of the ACK Pending State shown in FIG. 17.

How subsequent ACKs are handled by the state machine in the ACK Pending State 1702 is illustrated in FIG. 19. The state handling function starts by determining which event is being processed at step 1901. If an ACK has been received, the state machine increases the ACK count by 1 at step 1902 and adds the ACK to the buffer at step 1903. This follows the same procedure as described in connection with FIG. 15. Then, the final size of the current aggregated packet is determined at step 1904, and a comparison to the allowed MTU (MAX) on this TCP association between INDs is made at step 1905. This MTU can be provisioned as part of policy for TCP connections, with the MTU for the specific interface used for transmission of the aggregated packet, negotiated as part of signaling or discovered as part of a Path MTU discovery process. If the aggregated packet exceeds the allowed MTU, the state machine proceeds to the Send ACK State 1701; otherwise, the state machine goes back to sleep, waiting for the next event. Another valid event is the timer expiry. This timer length indicates that the IND encoder has waited long enough for subsequent ACKs and must send the packet. The duration of this timer can be provisioned, estimated from the round trip times of all packets snooped from this connection, or signaled as part of establishment of the IND's TCP association. If this event is received, the state machine proceeds to the Send ACK State 1702 at step 1907. If any other event is received, it is unexpected and an error message is printed at step 1908.

Figure 20:
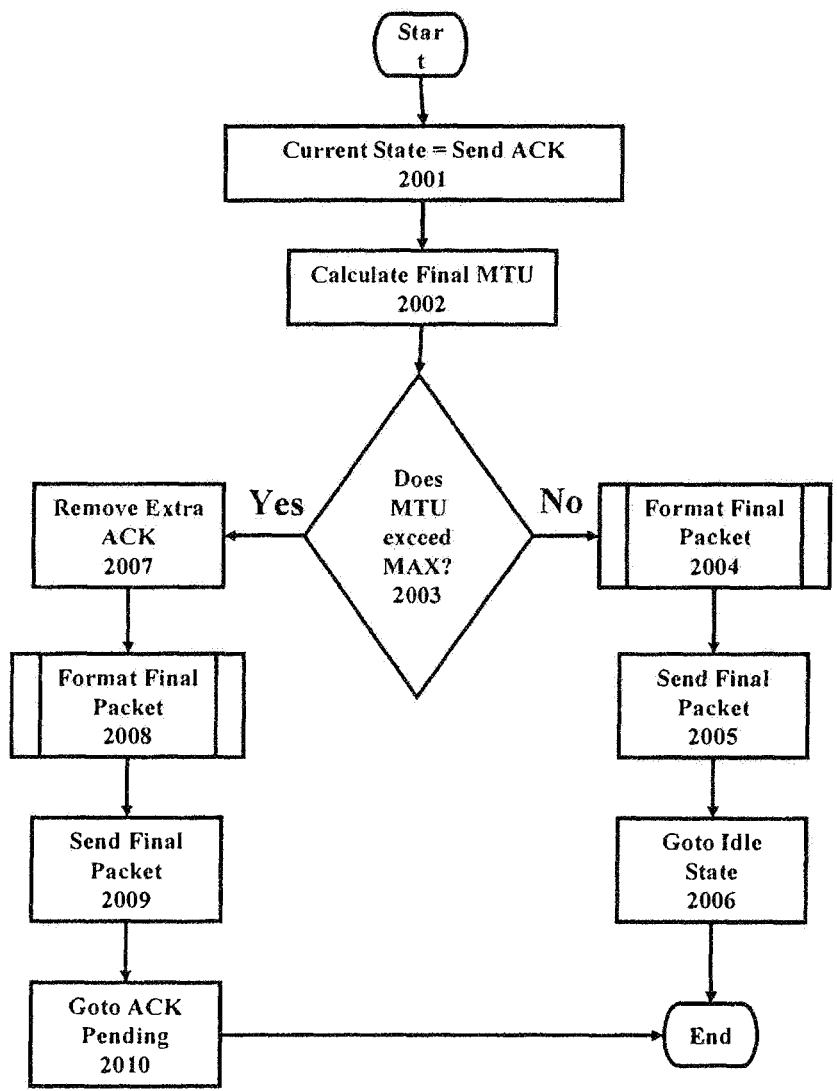
FIG. 20 is a flow chart of the state entry logic of the Send ACK State shown in FIG. 17.

Upon entering the Send ACK state 1702, the state machine needs to determine how to finalize the aggregated packet. As illustrated in FIG. 20, this is determined by calculating the final MTU size at step 2002, and then determining whether that size exceeds MAX at step 2003. If the packet exceeds the allowed MTU, an ACK is removed from the packet at step 2007, and the packet is then finalized as per FIG. 15 at step 2008 and sent at step 2009. Then, since an additional ACK has been received, a new ACK buffer is created by transitioning back to the ACK Pending State 1701. If the packet does not exceed the allowed MTU for this TCP association, the state machine can proceed directly to finalizing the aggregate packet as per FIG. 15 at step 2004, and then sends the packet at step 2005. Then the state machine transitions to the Idle State 1700 at step 2006.

Figure 21:
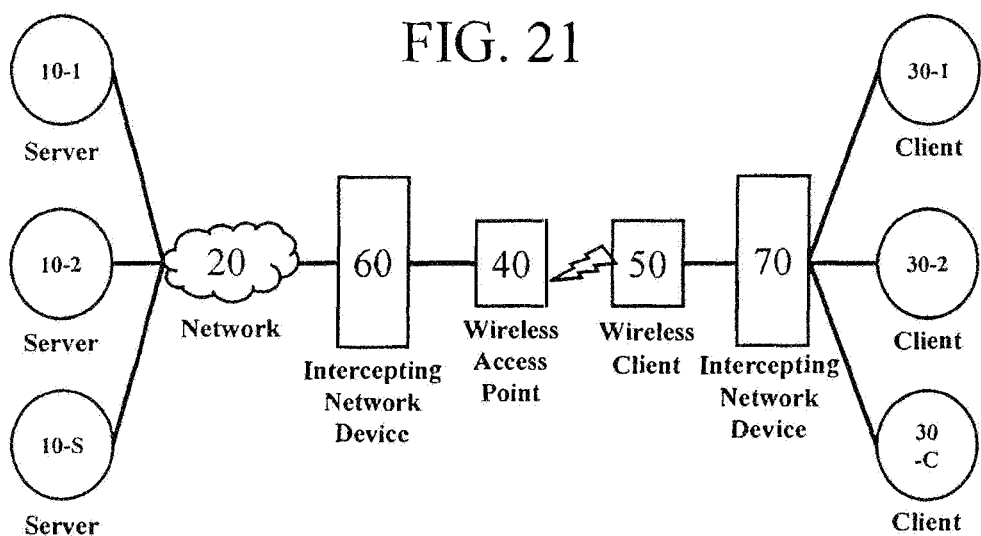
FIG. 21 is a modification of the system of FIG. 5 that includes multiple clients able to use IND 70.

This is one implementation of the aggregation of TCP ACKs. A variation of this algorithm is to aggregate TCP ACKs from multiple clients instead of a single client. This scenario is illustrated in FIG. 21 where multiple clients 30-1 to 30-C are speaking with multiple servers 10-1 to 10-S. An IND 70 aggregates ACKs from all the clients 30 which are sending traffic across the wireless LAN via IND 60. Since the method for aggregation illustrated in FIG. 15 does not make any changes to the TCP packets themselves, the algorithms described for creating aggregate packets for a single TCP connection also applies to creating aggregate packets for multiple TCP connections. Therefore, FIGS. 17-20 completely specify the encoder for this variation. The only difference is that TCP connections associated with this aggregation channel will come and go. The signaling which controls the association must also handle the addition and deletion of TCP connections.

Figure 22:
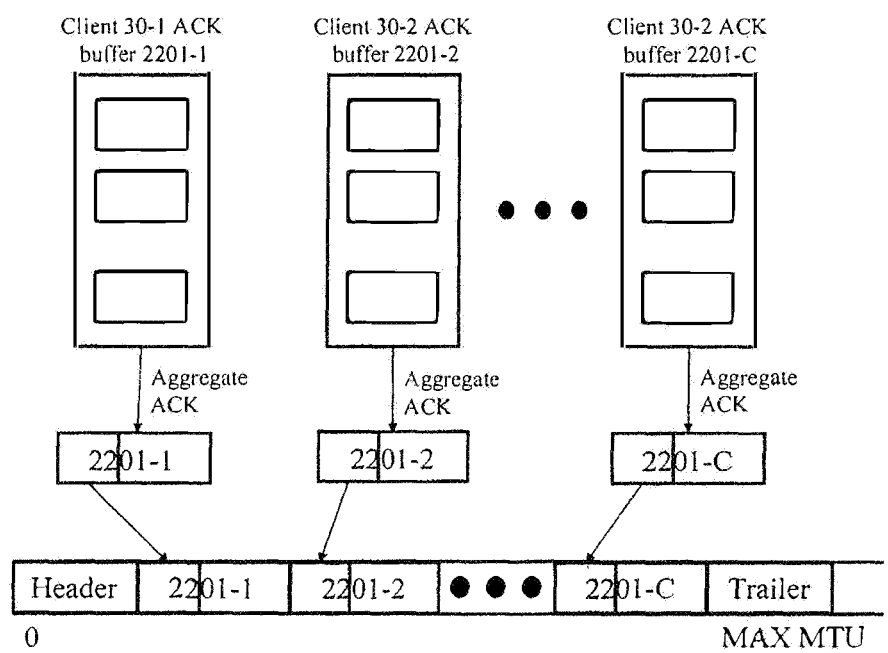
FIG. 22 is an illustration of the encoding algorithm for multiple TCP connections combined with the aggregation of TCP ACKs from a single connection.

Another variation allows for the combination of summarization of TCP ACKs with the aggregation of TCP ACKs for multiple TCP connections. FIG. 22 illustrates how this encoder operates. In this case, the encoder buffers TCP ACKs for multiple connections related to the clients 30-1 to 30-C. A single TCP ACK (2201) is derived from each connection, and these ACKs are labeled 2201-1 to 2201-C. An ACK for each active connection is then aggregated into a single packet and sent to the peer IND. The encoding of these packets is a variation of the state machine described in connection with FIGS. 17-20. The only difference is how the procedure for adding a packet to the buffer is handled in FIG. 19 at step 1803. Instead of just appending the ACK to the packet, the state machine must look for another ACK from the same connection. If one already exists, they are summarized together and placed into the packet. If a TCP ACK from the specific connection is not in the packet, then the TCP ACK is appended. Otherwise, the algorithm is identical. The decoding of the packets is the same as illustrated in FIG. 16.

The methods described above improve the wireless LAN network utilization by influencing the behavior of the client and server by manipulating the flow control algorithm. An alternate method influences the congestion control mechanisms provided by TCP. One option is to break-up an ACK transmitted by the client 30 into several ACKs. This stimulates the congestion window on the server through its additive increase/multiplicative decrease algorithm to increase the congestion window. TCP implementations increase the congestion window by a fraction of the TCP maximum segment size for every ACK that is received. By increasing the number of ACKs, the congestion window opens faster, putting more TCP segments in flight.

This encoding algorithm can increase bandwidth utilization from the client 30 to the server 10. Several parameters are defined to control the bandwidth used by the encoding algorithm. The first parameter is the MAXIMUM ACKs; which defines the maximum number of ACKs that can be generated from a single ACK. The MINIMUM SEGMENT SIZE determines the minimum difference between the sequence number of sequential ACKs. For example, MAXIMUM ACKs can be defined as 3 and MINIMUM SEGMENT SIZE can be defined as 500. If a packet arrives where the sequence difference between the current ACK and the previous ACK seen by the encoder is 2100 bytes, the encoder will produce 3 TCP ACKs each with a sequential difference of 700 bytes each. This encoding is limited by the MAXIMUM ACK parameter. If a TCP ACK arrives with a sequential difference of 400 bytes, this ACK is transmitted unchanged since it is less than the MINIMUM SEGMENT SIZE. Another method to control bandwidth is to define a duty cycle for the algorithm. This means that the encoding algorithm is enabled and disabled for defined periods. One method is to define these periods in terms of time defining a total period and a duty factor in percent. The duty factor defines the percentage of the period in which the encoding algorithm is operating. Another option is to define the periods in terms of packets. The total period is defined as PACKET_PERIOD. Within the PACKET_PERIOD, ENCODE_LIMIT defines the number of packets which are encoded.

Figure 23:
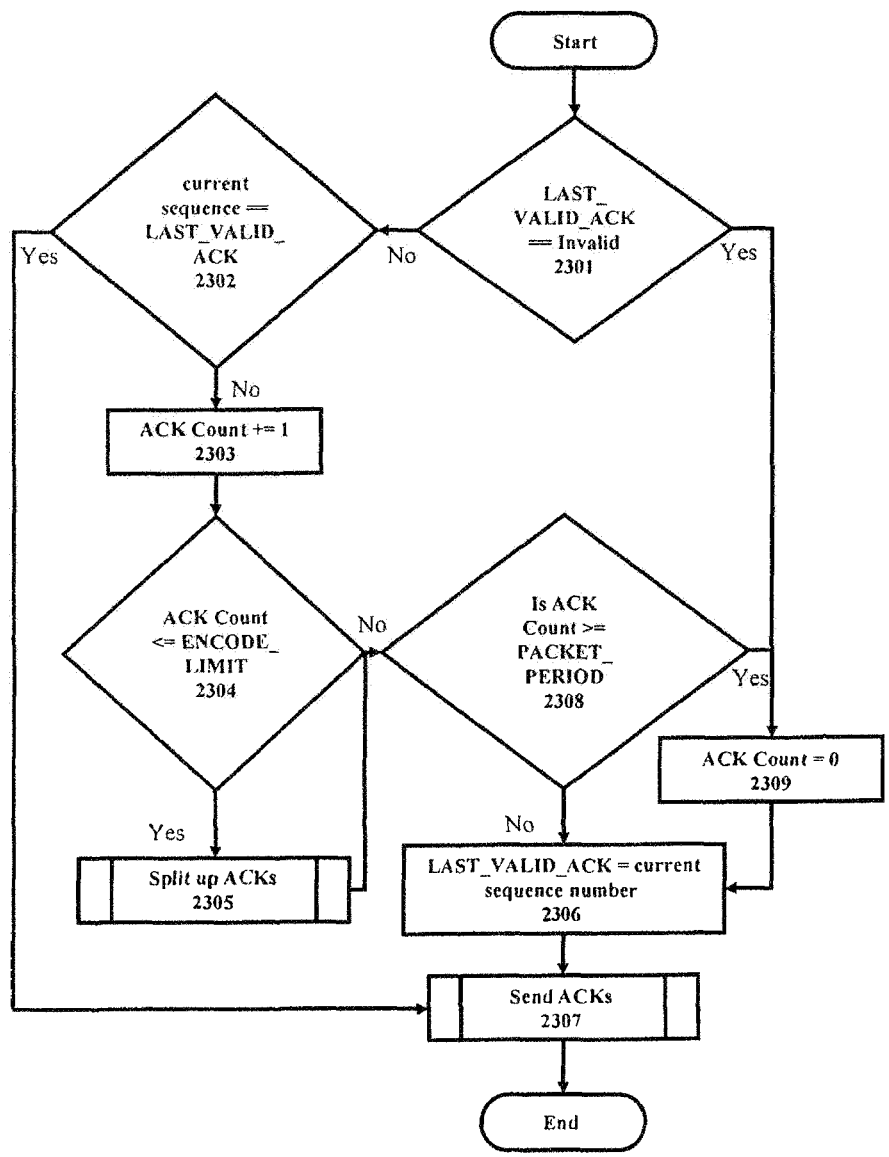
FIG. 23 is a flow chart of the algorithm for an IND encoder for splitting up a single TCP ACK into multiple ACKs.
Figure 24:
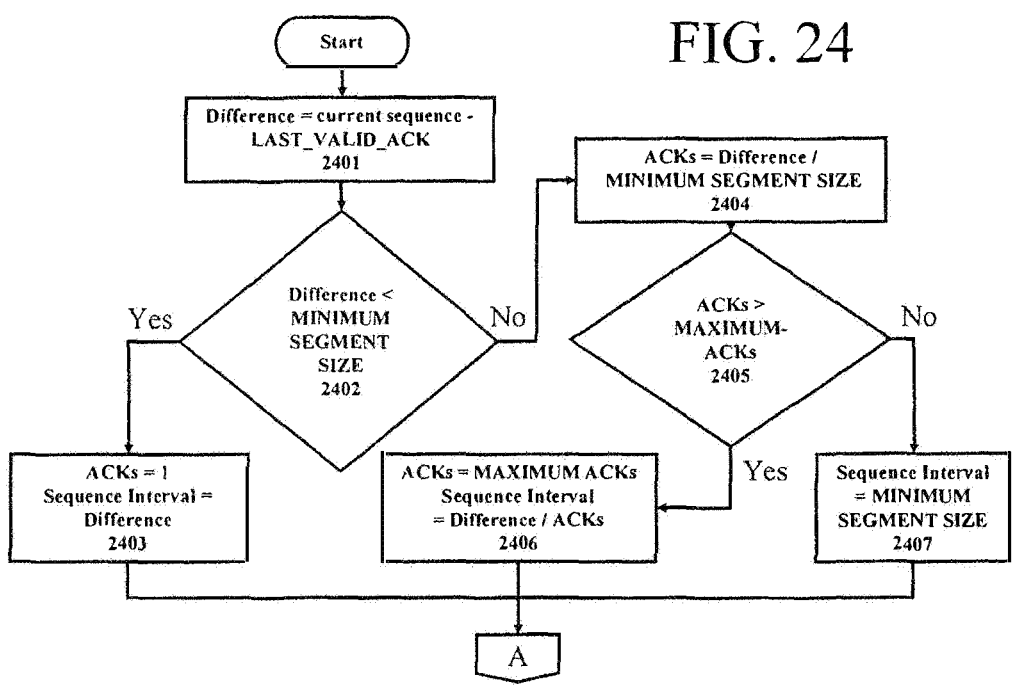
FIG. 24 is a flow chart of a mechanism for splitting a TCP ACK into multiple TCP ACKs.
Figure 25:
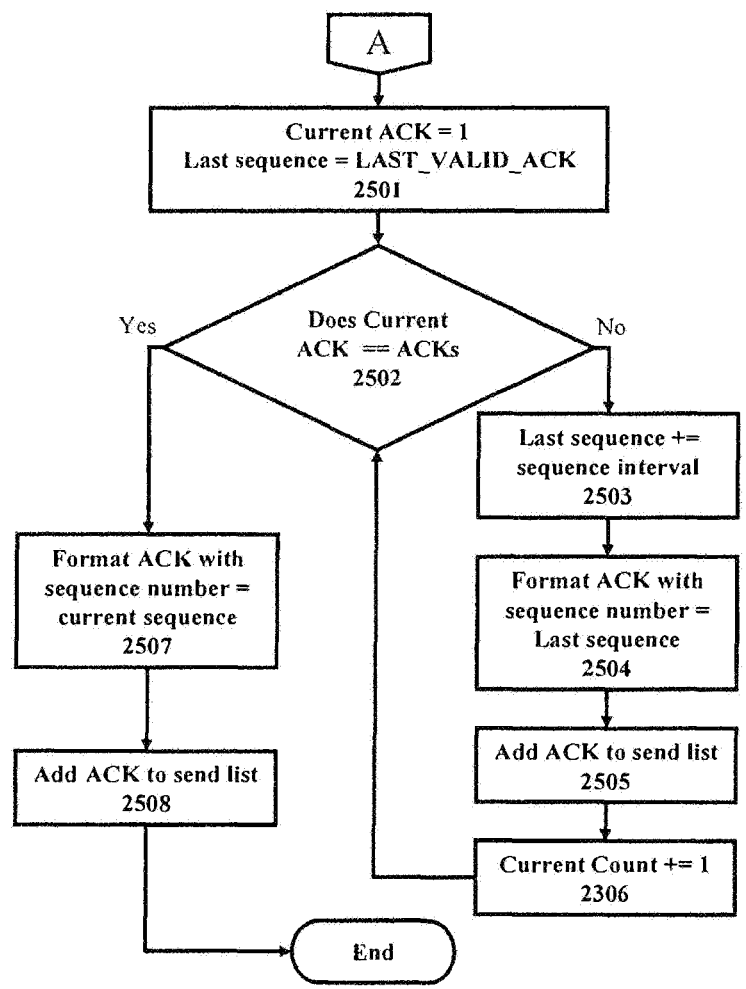
FIG. 25 is a continuation of the flow chart of FIG. 24.

The basic algorithm required to implement this function is provided in FIGS. 23-25. FIG. 23 illustrates the generic algorithm for splitting TCP ACKs. It starts by inspecting the LAST_VALID_ACK parameter at step 2301. This is used as the basis for splitting up the ACK before it is transmitted and ensures that each ACK is carrying valid information. Therefore, if this parameter is not valid, it is initialized to the current sequence number at step 2306, and the packet period counter, ACK COUNT, is initialized to zero at step 2309, and the ACK is transmitted at step 2307. Assuming the LAST_VALID_ACK parameter is valid, the current ACK sequence number is compared to the LAST_VALID_ACK at step 2302. If the current ACK sequence is equal to the LAST_VALID_ACK parameter, the associated TCP connection has experience lost, and this is signaled back to the server 10. Since this is the case, the ACK needs to get back to the server to initiate the fast recovery algorithms. Therefore, this ACK is sent immediately at step 2307. If the current sequence is not equal to the LAST_VALID_ACK, the ACK Count is incremented at step 2303 and compared to the ENCODE_LIMIT at step 2304. If the ACK Count is less than or equal to the ENCODE_LIMIT, the ACK is split up at step 2305, the LAST_VALID_ACK is set to the current sequence number at step 2306, and the ACKs are sent at step 2307. If the ACK Count is determined to be greater than ENCODE_LIMIT at step 2304, then the ACK Count is compared to the PACKET_PERIOD at step 2308. If the ACK Count is less than the PACKET_PERIOD, then LAST_VALID_ACK is set to the current sequence number at step 2306 and the ACK is sent at step 2307. Otherwise, the packet period is reset by setting ACK Count to Oat step 2309.

The method for sending ACK in step 2307 is represented as a procedure because how this is handled is optional. In a wired environment, packets can be just enqueued directly on an interface for transmission. The increase of bandwidth by the splitting of ACKs may be easily handled by the bandwidth provided by wired LANs. Any loss can be handled by the natural assumptions of TCP operation. No decoding is required in this mode of operation since the encoded packets are still standard TCP/IP packets. However, if this method is used on its own in a half-duplex wireless environment, the increased number of packets can decrease wireless LAN utilization due to the collision avoidance algorithm running on the wireless LAN. To avoid this issue, the splitting up of a TCP ACK can be combined with the aggregation of TCP ACKs into a single packet sent across the wireless LAN. That way, the additional packets do not incur additional wireless transmission overhead to reach their goal. Therefore, the procedure in step 2307 in FIG. 23 can be implemented using the state machine in FIG. 17. As illustrated in FIG. 16, this mode requires an association between 2 INDs so these packets can be decoded. This association can be signaled dynamically as the INDs discover the TCP associations between a client and a server.

A method of splitting up a TCP ACK is illustrated in FIGS. 24 and 25. The procedure starts by calculating the difference between the current sequence number and LAST_VALID_ACK at step 2401. If the difference is determined to be less than the MINIMUM_SEGMENT_SIZE at step 2402, only one ACK is produced at step 2403 by setting ACKs to 1 and Sequence Interval to Difference. If the difference is determined to be greater than MINIMUM_SEGMENT_SIZE at step 2402, the number of ACKs is determined by dividing the difference by the MINIMUM_SEGMENT_SIZE at step 2404. If the number of ACKs is determined to exceed the MAXIMUM_ACKs at step 2405, then ACKs is set to MAXIMUM ACKs and the sequence interval is set to the difference divided by MAXIMUM ACKs at step 2406. Otherwise, the sequence interval is set to MINIMUM_SEGMENT_SIZE at step 2407.

Now that the number of TCP ACKs and the sequence interval between the ACKs has been determined, the TCP ACK can be segments. This algorithm is illustrated in FIG. 25. To separate the ACK into multiple ACKs, a loop counter, current ACK is initialized to one, and the Last sequence is set to the LAST_VALID_ACK at step 2501. Then the loop condition is checked by comparing Current ACK to ACK, the total number of TCP ACKs to be generated at step 2502. If Current ACK does not equal ACK, then the sequence number of the first ACK is calculated using the Last sequence number plus the sequence interval at step 2503, and this ACK packet is generated at step 2504. Then the ACK is added to the list of ACKs to be sent at step 2505, and the ACK Counter is incremented at step 2506. This procedure repeats until Current ACK equals ACK at step 2502. At this point, the loop exits, and the final ACK is generated by setting the sequence number of the final ACK to the current sequence number at step 2507 and adding this ACK to the list of ACKS to be transmitted at step 2508.

Figure 26:
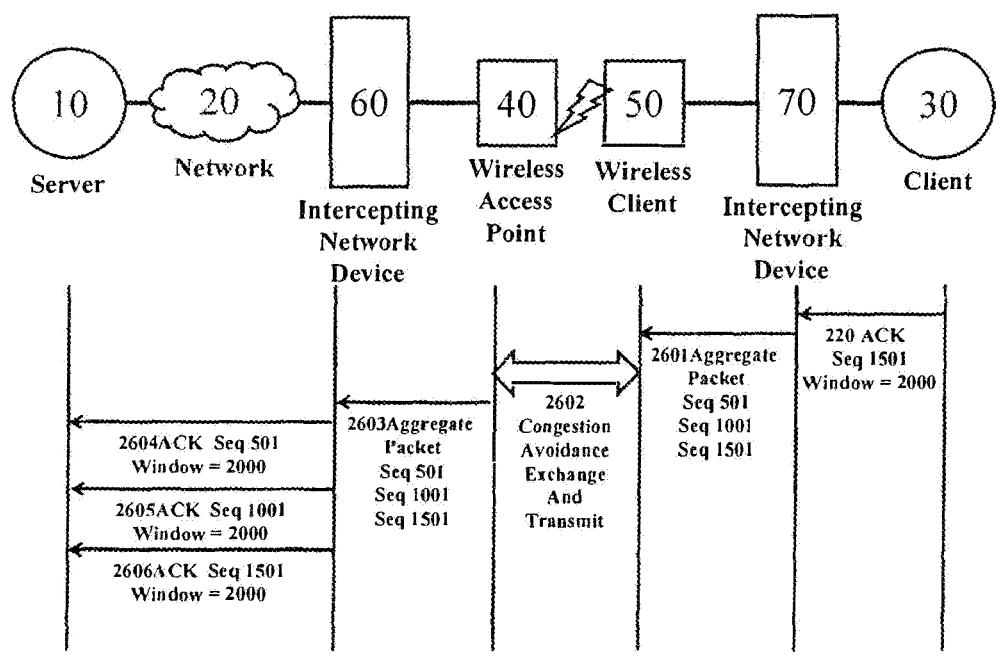
FIG. 26 illustrates an encoding algorithm for splitting up a single TCP ACK into multiple ACKs using the network of FIG. 5.

FIG. 26 shows an example of functionality using a message 220 from FIG. 2 traveling from the client 20 to the server 10 in the network shown in FIG. 5. FIG. 26 illustrates the algorithms of FIGS. 23-25, using the algorithm in FIG. 17 to aggregate the ACKs generated. In this example, ENCODE_LIMIT and PACKET_PERIOD have been set to one, having every TCP ACK split into multiple ACKs. MINIMUM_SEGMENT_SIZE is set to 500 bytes, and the MAXIMUM_ACKs is set to 4. The LAST_VALID_ACK is one. As a result, when the message 220 reaches IND 70, this message is split into 3 ACKs with sequence numbers 501, 1001 and 1501. These messages are aggregated into a single encoded message 2601 and sent to the wireless client 50. The wireless client 50 and the wireless AP 40 negotiate the transmission of the encoded packet at step 2602 using the collision avoidance algorithm, and this is passed onto IND 60 in a message 2603. The IND 60 unpacks the encoded TCP ACKs in the packet following the algorithm illustrated in FIG. 16. When the decoder completes its work, the 3 ACKs are forwarded to the server 30 which then increases its congestion window.

Depending on the Wireless LAN technology, transmission rates over the LAN may be limited. For example, an 802.1b network has only an 11-Mbps transmission rate versus an 802.1g network which has a 54-Mbps rate. Detection of the LAN type can be estimated and shared among the associated INDs, which can influence the level of encoding selected by the INDs for a particular association. If the link is discerned to be limited in either transmission rate or in packets per second, the encoding rate may be increased. If the INDs are summarizing or aggregating TCP ACKs, the encoding may be increased by increasing MAX_ACKs or increasing the timeout period of the ACK Pending Timer.

To ensure that the TCP ACKs are sent in a timely fashion, all of the encoders, irrespective of the algorithm being used, can set the TOS/DSCP bits of the outgoing packets to ensure that are delivered in a timely fashion. When the encoded packet arrives at the wireless LAN, 802.1 le can be employed to ensure that the TCP ACKs are delivered in a timely fashion. It can also be leveraged to reduce the overhead of the TCP ACK over the wireless LAN.

Embodiments of the invention may be implemented in a network having endpoints, such as servers or other computing devices, and associated encoding components. The encoding components, and the described methods, can be implemented in hardware, software or a combination thereof. Those portions that are implemented in software can represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of reducing a bandwidth usage of a network, said method comprising:
   intercepting a plurality of data packets transmitted between a source Transmission Control Protocol (TCP) client and one or more destination TCP clients;
   identifying one or more TCP acknowledgements created by said destination TCP clients within said plurality of data packets;
   receiving TCP acknowledgments;
   buffering said TCP acknowledgements; and
   implementing a state machine for each TCP connection between said TCP client and said one or more destination TCP clients, wherein each of said state machines contains an idle state for handling a time when there are no TCP acknowledgments, an acknowledgment pending state for when one or more conditions have not been achieved and a transitory state; wherein each state machine transitions from the acknowledgement pending state to the transitionary state when said one or more conditions have been achieved, the transitionary state for, in response to a configured amount of time expiring or a threshold number of TCP acknowledgments having been achieved:
   summarizing, said TCP acknowledgements into one or more summary acknowledgements; and
   transmitting said one or more summary acknowledgements.

2. The method of claim 1 wherein the TCP acknowledgements are related to a single TCP session.

3. The method of claim 1 wherein the TCP acknowledgements are related to a plurality of TCP sessions.

4. A system for reducing the bandwidth usage of a network, said system comprising:
   a source Transmission Control Protocol (TCP) client and one or more destination TCP clients;
   and one or more intercepting network devices located between the source TCP client and the one or more destination TCP clients and configured to:
   intercept a plurality of data packets transmitted between the source Transmission Control Protocol (TCP) client and the one or more destination TCP clients;
   receive TCP acknowledgments;
   buffer said TCP acknowledgements; and
   implement a state machine for each TCP connection between said TCP client and said one or more destination TCP clients, wherein each of said state machines contains an idle state for handling a time when there are no TCP acknowledgments, an acknowledgment pending state for when one or more conditions have not been achieved and a transitory state; wherein each state machine transitions from the acknowledgement pending state to the transitionary state when said one or more conditions have been achieved, the transitionary state for, in response to a configured amount of time expiring or a threshold number of TCP acknowledgments having been achieved:
   summarizing, said TCP acknowledgements into one or more summary acknowledgements; and
   transmitting said one or more summary acknowledgements.

5. The system of claim 4 wherein the TCP acknowledgements are related to a single TCP session.

6. The system of claim 4 wherein the TCP acknowledgements are related to a plurality of TCP sessions.

* * * * *